3,344,021
CONTROL OF ENDOPARASITES OF ANIMALS
Jacob J. Menn, Kirkwood, Mo., and Frank B. Folckemer, Union, and Alexander Miller, Jr., Short Hills, N.J., assignors to Shell Oil Company, New York, N.Y., a corporation of Delaware
No Drawing. Filed May 28, 1964, Ser. No. 371,082
5 Claims. (Cl. 167—53)

This application is a continuation-in-part of copending application Ser. No. 165,941, filed Jan. 19, 1962, now U.S. Patent No. 3,166,472.

This invention relates to a method for controlling endoparasites in mammals and birds, particularly in domestic animals and poultry.

Control of endoparasites—that is, internal parasites—of mammals and birds is one of the most important problems now encountered in animal husbandry. The magnitude of the problem is evident from the fact that internal parasites of livestock and poultry currently account for about half a billion dollars annual loss at the farm level, and that about twelve million dollars a year at the manufacturing level is spent annually for anthelmintics to control such parasites. Further losses, and costs for control of internal parasites are encountered in the raising of fur-bearing animals, domestic pets and the like. The parasites of major importance are the helminths—the internal worms.

The discovery of an effective, yet safe, anthelmintic has proven to be very difficult, for a successful anthelmintic must satisfy severe and in some ways contradictory requirements. Thus, a successful anthelmintic must: (a) be toxic to a wide spectrum of internal parasites; (b) not injure the host animal at the parasiticidally effective dosages; (c) be capable of ready introduction into the host animal by means which are adaptable to the treatment of few or many animals—preferably by incorporation into the animal's feed and/or water, which requires that the material be palatable to the animal; (d) be sufficiently stable in gastric juices and/or other body fluids and/or resist attack by microbes in the host animal that it can remain in the animal for a time sufficient to kill and/or cause elimination of the parasites from it; (e) not build up in concentration in the host animal—must be metabolized and/or excreted from the animal after it has done its job. In the case of ruminants, the successful anthelmintic also is one which does not adversely affect the microflora present in the rumen, for the presence of the microflora in the rumen is essential to conversion of cellulose materials to low molecular weight fatty acids which the ruminant can assimilate.

Since about 1956, organophosphorus compounds of various kinds have been investigated as possible anthelmintics, and many have been found to have potential value for this purpose. The organophosphorus anthelmintics have proven to have certain drawbacks however. All are more or less toxic to mammals and in many cases the safety factor—the difference between the parasiticidally effective dosage and the dosage which is toxic to the animal host—is so small that extreme care must be taken in using these anthelmintics, and despite the greatest care it is not unusual to find the host animals adversely affected by the anthelmintic. Further, the phosphorus anthelmintics do not seem to act consistently, particularly where the host animal is a ruminant. A possible explanation for this behavior appears to lie in the physical make-up of the animal: the parasites to be controlled are usually present in the abomasum and/or the intestines, and to contact them, the anthelmintic must pass through, and be subjected to the effects of the fluids and microorganisms in the rumen, the reticulum and the omasum of the animal; organophosphorus compounds appear to be insufficiently stable to enable them to pass unchanged through these parts of the ruminant digestive system. Also, the absorption of chemicals is readily effected in the rumen, so that the organophosphorus compound may be removed therein and not pass on to the abomasum. In the case of monogastric animals, the instability of the phosphorus compounds would appear to be a factor in their sometimes inconsistent anthelmintic effects. A further drawback of the phosphorus anthelmintics is the fact that many of them have been found to be unpalatable to animals, and to render food with which they are mixed unpalatable to animals. In the cases of these anthelmintics, special techniques such as drenches must be used to introduce them into the animals—such materials cannot be simply mixed with the animals' food and/or water. These materials therefore do not lend themselves readily for treatment of large numbers of animals.

It is thus evident that while organophosphorus compounds are of substantial interest as potential anthelmintics, a number of serious problems must be solved before the potential value of such compounds as anthelmintics can be realized, and they can be used effectively yet safely for controlling internal parasites of animals.

It has now been discovered that a class of organophosphorus compounds defined by the formula:

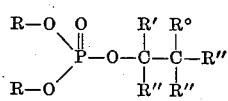

wherein each of R is alkyl of up to seven carbon atoms, R' is hydrogen or a group represented by R, R° is hydrogen or middle halogen (bromine or chlorine) and R" is middle halogen, can be used more effectively, and much more safely, if they are incorporated in polyvinyl chloride or polyvinylidene chloride resins, and the resulting compositions used to treat the host animals. The anthelmintic slowly passes from the body of the composition to the surface thereof, and the anthelmintic on the surface of the composition is available to act as the active anthelmintic. Thus, incorporation of the anthelmintic in the resin conserves the anthelmintic, yet making the anthelmintic available at controlled rates to destroy the parasites—there is made available on the surface of the particles of the composition sufficient of the anthelmintic to destroy the parasites, but the remainder of the anthelmintic is kept within the particles of the composition and thereby prevented from contact with gastric juices and other body fluids and/or microbes which would cause its decomposition. As a result, in a ruminant for example, the resin-anthelmintic formulation will pass through the rumen, reticulum and omasum without loss of effectiveness against the parasites in the abomasum and intestine. By proper choice of resin, the rate at which the anthelmintic passes from the inside to the surfaces of the particles of the composition can be controlled to effectively destroy and/or eliminate the parasites from the host animal within the time period during which the formulation is present in the abomasum and intestine. By incorporating the anthelmintic in polyvinyl chloride the effectiveness of the anthelmintic is retained, and the safety factor is markedly increased without reducing the effectiveness of the anthelmintic. A further advantage of the use of the resin-anthelmintic composition is the fact that the composition present in the feces remains effective, thus killing the larvae of endoparasites therein, and the larvae of insects which lay eggs in the feces. Since the organophosphorus compounds of the invention usually are also insecticidal, insects feeding on the feces also will be controlled.

Considered in a generic sense, therefore, the present invention comprises an improved method for controlling endoparasites in mammals and birds, which method comprises orally administering to an infested mammal or bird a parasiticidally effective dosage of a composition comprising at least one organophosphorus anthelmintic of the class described above in intimate admixture with the polyvinyl chloride.

Of particular interest are the compounds of the subgenus represented by the formula:

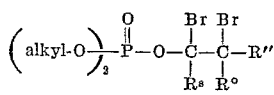

wherein alkyl represents an alkyl group of from one to four carbon atoms, R″ represents middle halogen, preferably chlorine, $R^s$ represents hydrogen or alkyl of from one to four carbon atoms, and $R^o$ represents hydrogen or middle halogen, preferably chlorine. Most potent appear to be those wherein $R^s$ is hydrogen, R″ is chlorine and $R^o$ is chlorine.

Typical species of these compounds include:

Dimethyl 1,2-dibromo-2,2-dichloroethyl phosphate
Dimethyl 1,2,2-tribromoethyl phosphate
Dimethyl 1,2-dichloro-2-bromoethyl phosphate
1,2,2-trichloroethyl dimethyl phosphate
1,2-dibromo-2,2-dichloroethyl di-sec-butyl phosphate
Diethyl 1,2-dibromo-2,2-dichloroethyl phosphate
1,2,2,2-tetrabromethyl dimethyl phosphate
1,2 - dibromo - 2,2 - dichloro - 1 - phenylethyl dimethyl phosphate
1,2-dibromo-2-chloro-1-phenylethyl diethyl phosphate
1,2-dibromo-2,2-dichloroethyl ethyl 1,2 - dichloropropyl phosphate These compounds are most conveniently prepared by halogenating the corresponding vinyl phosphates which are known compounds.

The preparation of a particular species of these compounds is shown in U.S. Patent No. 2,971,882.

Of special interest as an anthelmintic is dimethyl 1,2-dibromo-2,2-dichloroethyl phosphate, known in the art as naled or under the trade name of Dibrom.

The thermoplastic resins generally suitable for forming the resin-anthelmintic compositions for use in the method of this invention are the polyvinyl chloride resins and polyvinylidene chloride resins. The essential characteristics of the suitable resins are that they be solids at temperatures encountered in storerooms and in fields, that they not absorb any appreciable amount of water (that it absorb at most about 2 percent and preferably less than 1 percent of its weight of water) and that they have substantial miscibility with the insecticides used in the preparation of the granular formula. Preferably the resin used is completely hydrophobic. These requirements are satisfied by the thermoplastic resins having a molecular weight of 5000 or above. The polyvinyl chloride resins and polyvinylidene resins satisfy these requirements.

The organophosphorus anthelmintics contemplated by invention are in general plasticizers for polyvinyl chloride and polyvinylidene chloride resins. Consequently, the resin-anthelmintic compositions used in the method of this invention can be prepared by any of the usual processes used for introducing a plasticizer into a resin. In many cases, intimate mixing will readily effect introduction of the anthelmintic into the resin. In other cases, it may be desirable to employ a solvent to aid in introducing the anthelmintic into the resin. Fluid pastes, or "plastisols," can be made which can be molded, extruded, cast, blown or otherwise formed into such other shapes as sheets, films, rods, granules, foams, powders and the like. In some cases, the mixture of the dialkyl ester and the resin must be heated, preferably in a closed vessel up to about 100° C. or higher to achieve solidification, or "fusion," of the resin. Alternatively, the ester may be incorporated in the resin by milling, by the use of mutual solvents, and by other similar blending methods.

The amount of the anthelmintic incorporated into the resin will depend upon the physical character and activity of the anthelmintic, upon the chemical and physical character of the resin, and upon the intended physical state of the final product—whether granular, powdered, solid, foam, or the like. The critical factor in every case is the rate at which it is desired that the anthelmintic become available at the surfaces of the particles of the resin-anthelmintic compositions, and will be determined in a given case by preliminary examination readily conducted by one ordinarily skilled in the art. For ready handling, it is desirable that the composition be dry and solid to the touch, and free-flowing. To insure this state, it is necessary to maintain the concentration of anthelmintic in the composition below about seventy percent by weight. To reduce the amount of resin which must be used, it is ordinarily desirable that the concentration of anthelmintic be at least about five percent of the weight of the composition, and ordinarily is at least about twenty percent of the weight of the composition.

The compositions prepared in this way consist of the anthelmintic in solid solution in the resin, the anthelmintic being present substantially unchanged chemically.

The preparation of suitable resin-anthelmintic compositions is described in detail in co-pending application Serial No. 85,445, filed January 30, 1961, now abandoned and in the interest of brevity the here-pertinent portions of that application are incorporated herein by reference to further describe the preparation and properties of such compositions. The compositions whose preparation is described in general, and in detail in the examples included in, the said co-pending application, are all suitable in the method of this invention, the preferred compositions being those in which the anthelmintic is dimethyl 1,2-dibromo-2,2-dichloroethyl phosphate and the resin is a polyvinyl chloride.

The preparation of suitable polyvinyl chloride formulations of a typical species of the anthelmintics contemplated in this invention, is illustrated in the following example, in which a composition of the following content:

| Substance: | Percent by weight |
|---|---|
| Dimethyl 1,2-dibromo-2,2-dichloroethyl phosphate | 20 |
| Di-(2-ethylhexyl)phthalate | 20 |
| Bakelite QYNV moulding grade polyvinyl chloride | 57 |
| Mark WS [1] (Argus Chemical Company) | 2 |
| Mark C [2] (Argus Chemical Company) | 1 |

[1] A mixture of organic barium and cadmium salts, a commercial stabilizer of PVC.
[2] A proprietary chelating compound to stabilize PVC.

was prepared by mixing the liquid ingredients together, then adding the mixture to the blended solids to form a paste. The paste was heated in an oil bath for 7 minutes at 300° C. to form a melt. The melt was allowed to cool to room temperature. The composition was found to be a solid, firm, resilient plastic composition.

The hereinbefore described class of organophosphorus anthelmintics may be used to control such endoparasitic organisms as the endoparasitic roundworms, pinworms, whipworms, threadworms, cecal worms, stomach worms, hairworms, threadnecked worms, cooperias, and the like. Some of these organophosphorus anthelmintics are believed to act topically, while others act systemically, and thus can control such endoparasites as the larvae or heel flies, bomb flies, bot flies and the like, such as species of Haemonchus, Trichostrongylus, Ostertagia, Cooperia, Trichuria, Oesophagostomum, Strongyloides, Ascaris, Nematodirus, and Gasterophilus. These organophosphorus anthelmintics also may be used to control flatworms (of the Cestoda, such as those of Hymenolepis). These organophosphorus anthelmintics appear to be effective in controlling endoparasites of mammals and birds, generally, and more particularly, in controlling endoparasites in livestock, such as cattle, swine, sheep, and goats, in domestic pets, such as dogs and cats, in rabbits, in poultry such as chickens, turkeys, geese and the like, in fur bearing animals such as mink, foxes, chinchillas, and the like.

These organophosphorus anthelmintics apparently can be used to eradicate parasites already present, and/or they can be used prophylactically—to cure already present worm infestation and can be used to prevent reinfestation.

The dosage of the anthelmintic to be used will depend upon the particular kind or kinds of parasites to be controlled, the particular anthelmintic resin composition to be used, the kind of host animal, whether the anthelmintic is to be used to cure an already existing infection, or merely as a prophylactic, and the like. These factors are those ordinarily encountered in the treatment of animals to cure and/or prevent their infestation by endoparasites; these factors and their solution all are well known to the practitioners of the art. In general, however, larger dosages are required to cure an already existing infestation than are required for prophylaxis. Thus, dosages of the resin-anthelmintic composition to provide as little as 1 milligram of the anthelmintic per kilogram of the live body weight of the animal fed at regular intervals—twice daily or daily, for example—may be sufficient to prevent infestation of animals by endoparasites. However, prophylactic dosages ordinarily will amount to about 15–25 milligrams of the anthelmintic per kilogram of the animal body weight. The dosage required to eradicate already existing endoparasites ordinarily will be at least about 10 milligrams of the anthelmintic per kilogram of the animal body weight, with usual dosages being about 20 to 50 milligrams on the same basis. The maximum dosage, of course, in every case will be determined by the toxicity of the anthelmintic to the host animal. By proper choice of resin, the resin-anthelmintic compositions used in the method of this invention provide an excellent safety factor—effectively eradicating endoparasites without ill effect upon the host animal.

For best results, the resin-anthelmintic composition should be present in the gastro-intestinal tract of the host animal in the form of particles. Consequently, it is preferred that the composition be in the form of particles, by which is meant granular forms, powders and dusts. These compositions are palatable to animals, and accordingly can be incorporated in animal feeds. If desired, however, the compositions can be suspended in water, milk, or the like, and given as a drench, or the compositions can be formed into tablets, or the like, or encapsulated, for introduction into the animal.

We claim:
1. A method for controlling internal parasitic worms in mammals, which comprises orally administering to an infested mammal a parasiticidally effective dosage of a composition comprising a compound of the formula

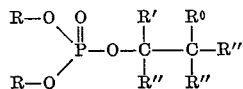

wherein R is alkyl of 1 to 7 carbon atoms, R' is a member of the group consisting of hydrogen and R, R⁰ is a member of the group consisting of hydrogen, chlorine and bromine, nad R'' is a member of the group consisting of chlorine and bromine, in intimate admixture with a resin of the group consisting of polyvinyl chloride and polyvinylidene chloride, a part of the said compound being on the surface of the composition.

2. A method for controlling internal parasitic worms in mammals, which comprises orally administering to an infested mammal a parasiticidally effective dosage of a composition comprising a compound of the formula

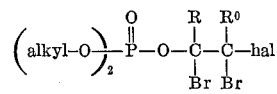

wherein "alkyl" is alkyl of from 1 to 4 carbon atoms, "hal" represents a member of the group consisting of chlorine and bromine, R represents a member of the group consisting of hydrogen and alkyl of from 1 to 4 carbon atoms, and R⁰ represents a member of the group consisting of hydrogen and chlorine, in intimate admixture with polyvinyl chloride resin, a part of the said compound being on the surface of the composition.

3. A method for controlling internal parasitic worms in mammals which comprises orally administering to an infested mammal a parasiticidally effective dosage of a composition comprising dimethyl 1,2 - dibromo - 2,2-dichloroethyl phosphate in intimate admixture with polyvinyl chloride resin, a part of said phosphate being on the surface of the composition.

4. An anthelmintic composition comprising an animal feed for mammals containing an anthelmintic dosage of a compound of the formula

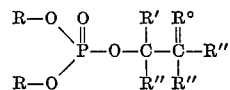

wherein R is alkyl of 1 to 7 carbon atoms, R' is a member of the group consisting of hydrogen and R, R⁰ is a member of the group consisting of hydrogen, chlorine and bromine, and R'' is a member of the group consisting of chlorine and bromine, in intimate admixture with a resin of the group consisting of polyvinyl chloride and polyvinylidene chloride, a part of the said compound being on the surface of the resin.

5. An anthelmintic composition comprising an animal feed for mammals containing an anthelmintic dosage of dimethyl 1,2 - dibromo - 2,2 - dichloroethyl phosphate in intimate admixture with polyvinyl chloride resin, a part of said phosphate being on the surface of the resin.

References Cited
UNITED STATES PATENTS

| | | | | |
|---|---|---|---|---|
| 3,166,472 | 1/1965 | Menn | | 167—53 |
| 3,179,561 | 4/1965 | Kuebler | | 167—53 |

ALBERT T. MEYERS, *Primary Examiner.*

SAM ROSEN, *Examiner.*